April 5, 1955   D. W. MacLEOD   2,705,653
SEALING MEANS FOR CHAMBERS OF RUBBER MIXERS OR THE LIKE
Filed March 12, 1951   4 Sheets-Sheet 1

INVENTOR
Douglas W. MacLeod
BY
Rockwell Bartholow
ATTORNEYS

April 5, 1955 D. W. MacLEOD 2,705,653
SEALING MEANS FOR CHAMBERS OF RUBBER MIXERS OR THE LIKE
Filed March 12, 1951 4 Sheets-Sheet 3

INVENTOR
Douglas W. MacLeod
BY
Rockwell Bartholow
ATTORNEYS

April 5, 1955  
D. W. MacLEOD  
2,705,653  
SEALING MEANS FOR CHAMBERS OF RUBBER MIXERS OR THE LIKE  
Filed March 12, 1951  
4 Sheets-Sheet 4
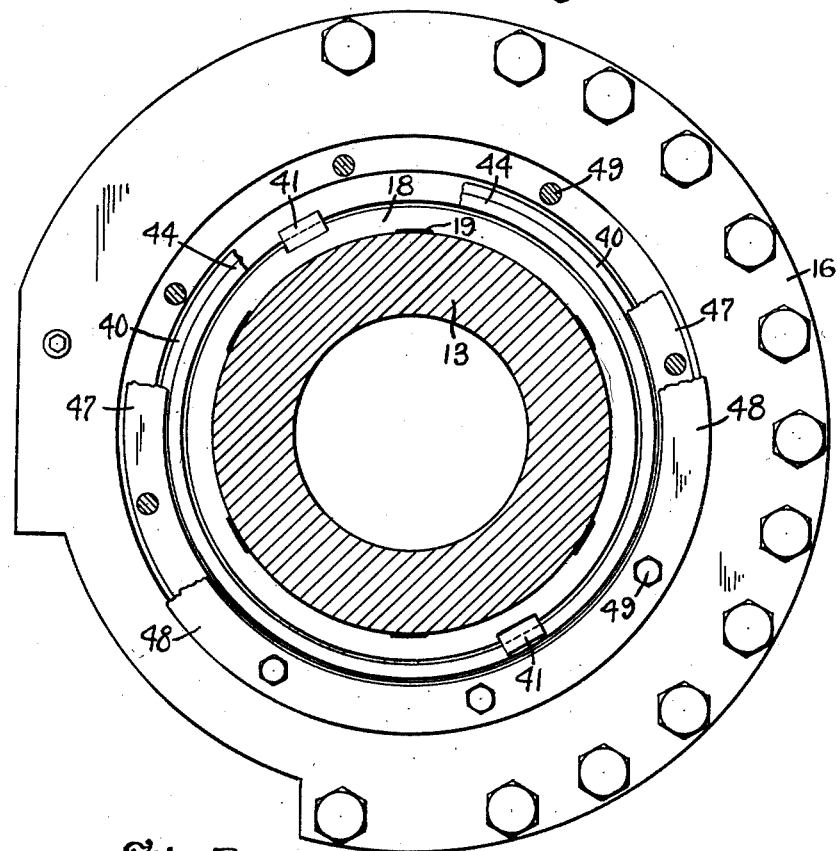
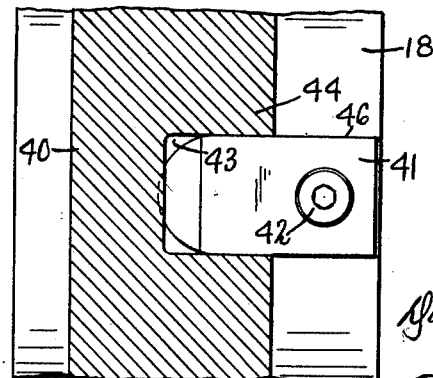
INVENTOR  
Douglas W. MacLeod  
BY  
Rockwell & Bartholow  
ATTORNEYS

United States Patent Office 2,705,653
Patented Apr. 5, 1955

2,705,653

SEALING MEANS FOR CHAMBERS OF RUBBER MIXERS OR THE LIKE

Douglas W. MacLeod, Ansonia, Conn., assignor to Farrel-Birmingham Company, Incorporated, Ansonia, Conn., a corporation of Connecticut Application March 12, 1951, Serial No. 215,133

2 Claims. (Cl. 286—10)

This invention relates to mixers for rubber and other plastic materials, and more particularly to a device of this kind which is provided with a mixing chamber and one or more bladed rotors operating within the chamber, such, for example, as the well-known Banbury-type mixer.

In the operation of devices of this character, it very often occurs that a relatively high pressure is present in the mixing chamber, and this pressure tends to force the materials which are being mixed from the chamber, particularly around the rotor shaft or shafts. These shafts extend through the end walls of the mixing chamber and, notwithstanding the fact that shaft packings and other means have been provided to retain the material in the chamber, nevertheless the high pressure which often obtains therein is such that there will be leakage about the extended ends of the rotor shafts.

It is contemplated by the present invention to provide sealing means for the rotor shafts, which means are provided adjacent the end walls of the chamber where the shafts extend therethrough so that the space around the shafts will be effectively sealed and any of the materials within the chamber will be prevented from being forced from the chamber around the shafts.

In the mixing or mastification of rubber, for example, certain materials are mixed with the rubber batch in the form of powder and it is particularly difficult to prevent these reinforcing or filling powders from being forced from the chamber unless the spaces about the rotor shafts are tightly sealed. In the present invention such sealing means is provided around the rotor shafts in the form of two cooperating sealing members, one of which is carried by the shaft, and the other of which is carried by the end wall of the chamber, and the arrangement is such that the pressure within the chamber tends to force one of these sealing members against the other so that the greater the pressure within the chamber, the more effective will be the sealing means to prevent materials being forced from the chamber.

One object of the present invention is to provide an effective sealing means about the rotors of mixing devices for plastic materials such as rubber mixers, for example.

A still further object of the invention is to provide a mixing or masticating machine having a chamber and a rotor or rotors within the chamber with an effective sealing means to seal the space about the rotor shaft where it projects through the end wall of the chamber to prevent materials in the chamber from being forced through this space.

Still another object of the invention is to provide a mixing or masticating machine of the character described with effective sealing means between the rotor shaft and the end wall of the mixing chamber, which sealing means is comprised of one or more pairs of cooperating members, one member of the pair being secured to the end wall of the chamber and the other member of the pair being carried by the rotor, the two members making tight surface contact with each other and being forced together by the pressure which exists within the chamber.

A still further object of the invention is to provide a sealing means for the space about the rotors of a mixing or masticating machine of the character described, such that one of the two cooperating members will be movable and will be forced against the other or fixed member by the pressure existing within the chamber so as to prevent materials being forced from this chamber by the pressure existing therein.

To these and other ends the invention consists in the novel features and combination of parts to be hereinafter described and claimed.

In the accompanying drawings:

Fig. 6 is a sectional view similar to Fig. 4 of the modified form of invention shown in Fig. 5; and Fig. 7 is a sectional view on line 7—7 of Fig. 5.

Figure 1:
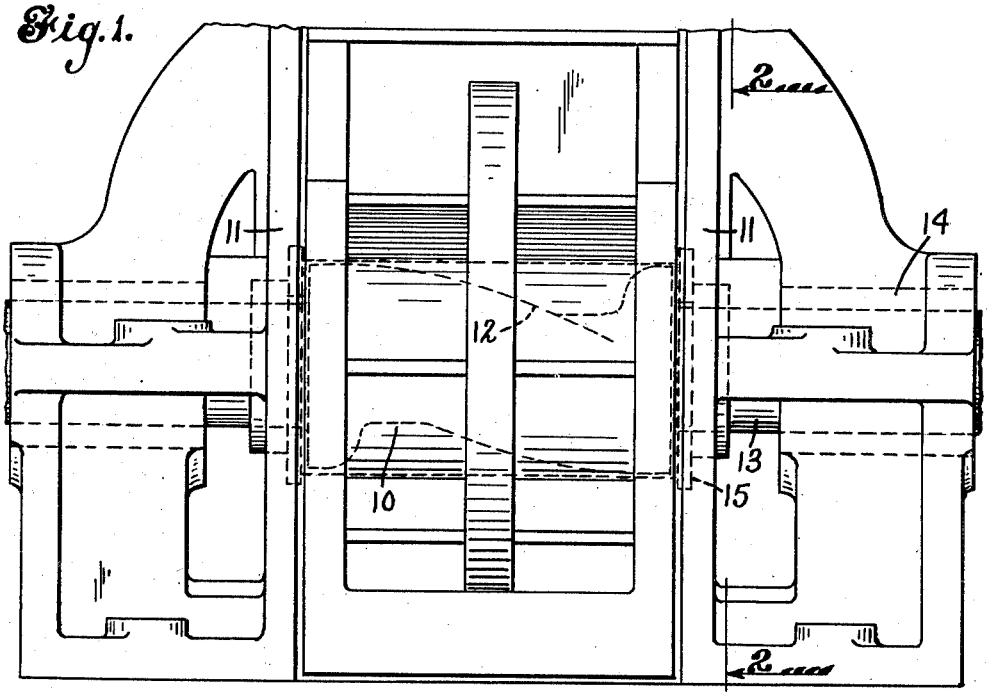
Fig. 1 is a front elevational view of a portion of a mixing or masticating machine embodying my invention.
Figure 2:
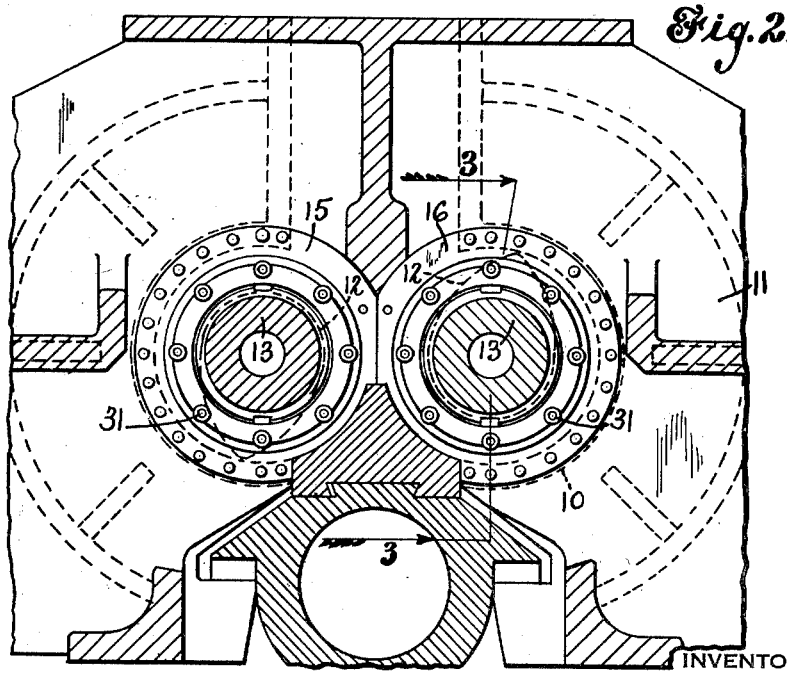
Fig. 2 is a sectional view on line 2—2 of Fig. 1.

To illustrate a preferred embodiment of my invention I have shown in the drawings a mixer or masticator of the Banbury type having a chamber 10 supported in the usual manner, which chamber is provided with end walls 11. As shown, the mixer is of the double cylindrical type and in each portion thereof is provided a bladed rotor 12 mounted upon a shaft 13 which extends through openings in the end wall of the chamber and is supported in bearing housings 14 on each side of the chamber. The end wall of the chamber is provided by the two substantially circular plates 15 and 16 (Fig. 2) which plates close the ends of the chamber and which are provided with openings 17 through which the rotor shafts 13 extend, the bearing housings 14 being spaced a short distance from these plates.

Figure 3:
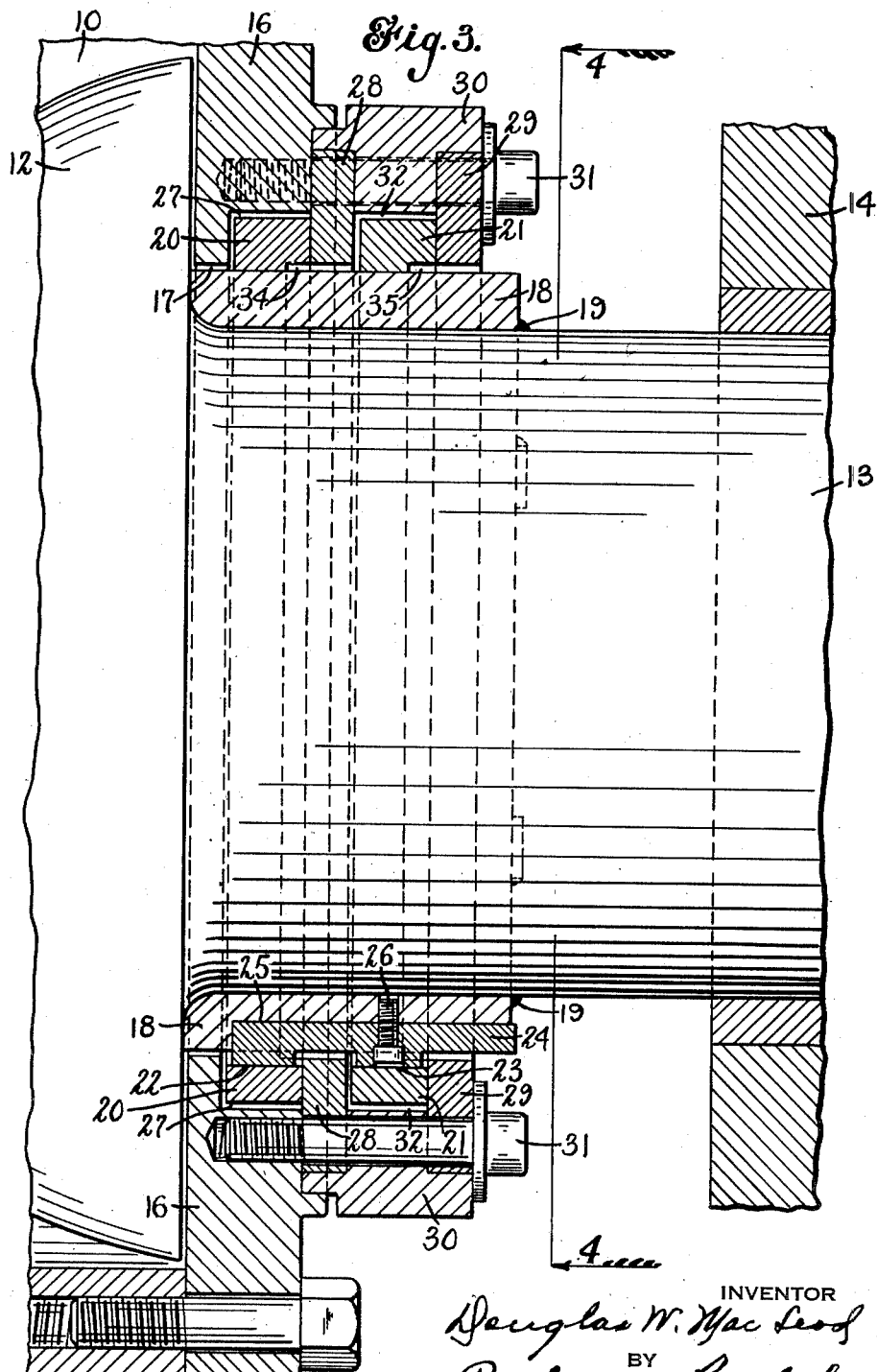
Fig. 3 is a sectional view through one of the rotors on line 3—3 of Fig. 2.
Figure 4:
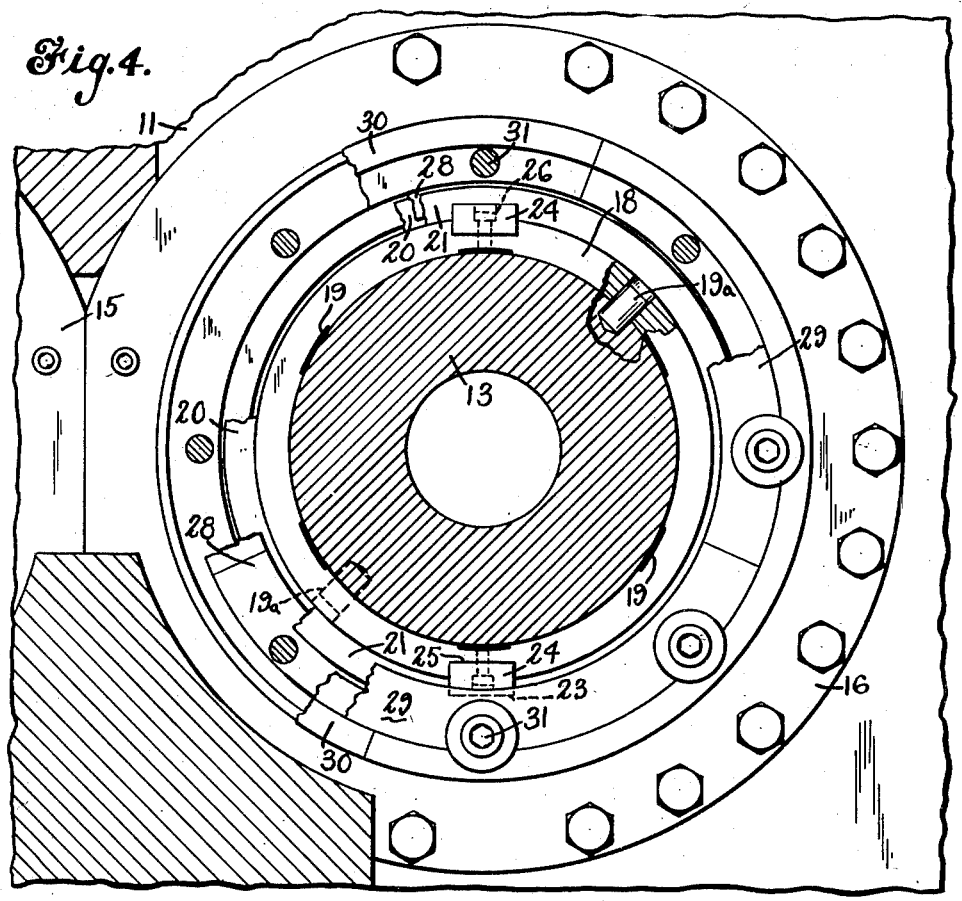
Fig. 4 is a sectional view on line 4—4 of Fig. 3 with some parts broken away for the sake of clearness.

In the usual construction a collar ring 18 is secured as by welding or the like 19 to the rotor shaft 13, and, as illustrated in Fig. 4, is also secured to this shaft by dowels 19ª, which collar, as shown in Fig. 3, extends to the rotor 12 and lies within the opening 17 in one of the end plates 16. There is, as will be observed, a slight space between this collar and the periphery of the opening 17 of the end plate, and means is provided to effectively seal this opening so that materials within the chamber will not be forced from the chamber through this opening.

Surrounding the collar ring 18 are a pair of floating rings 20 and 21, these rings being grooved, as shown at 22 and 23, to receive a key 24 which is set into a groove 25 in the collar ring 18 so that the key 24 lies partially within the ring 18 and partially within the rings 20 and 21, as shown more especially on Figs. 3 and 4. Two of the keys 24 are provided as shown on Fig. 4, these keys securing the rings 20 and 21 nonrotatably to the collar 18 but at the same time the rings 20 and 21 are permitted a slight movement axially of the shaft 13 or tend to float axially of this shaft as will be more particularly described hereinafter. The keys 24 may be secured to the ring 18 by set screws 26. It will be apparent, therefore, that the rings 20 and 21 will rotate with the shaft 13 but will be permitted a slight movement longitudinally of the shaft as they are slightly narrower than the spaces in which they are mounted, such, for example, as the space 27 in the end plate 16.

Cooperating with the floating rings 20 and 21 are wear rings 28 and 29. These rings are secured to the end plates, as will be hereinafter described, and preferably are split rings, that is, are divided into two or more sections so that they may be more readily secured in place about the shaft 13 when replacement is needed or when for any reason the sealing means must be disassembled. These rings are held in place by a container ring 30 secured by bolts 31 to the end plate 16, these bolts passing through openings in the two rings 28 and 29 and forcing the entire assembly closely against the end plate 16. The container or supporting ring 30 is also preferably split or divided into one or more sections so that these sections may be separately secured in place.

It will be noted that the width of the floating ring 21 is slightly smaller than the distance between the opposing surfaces of the wear rings 28 and 29 so that provision is made for slight movement of the ring axially of the shaft 13, thus leaving a small space 32 about the floating ring 21.

It may also be noted that the key 24 is cut away between the floating rings 20 and 21 and also at the outer side of the latter ring so that the outer surface of the key will clear the inner surface of the wear rings 28 and 29.

With the above construction it will be seen that the floating ring 20 is allowed to slight movement between the adjacent portion of the end plate 16 and the wear ring 28 while the floating ring 21 is allowed a slight movement between the wear rings 28 and 29. It will also be apparent that any material which is forced through that portion of the opening 17 in the end plate 16 between the inner periphery of this opening and the collar 18 will be forced into the space 27 and will tend to force the floating ring 20 tightly against the wear ring 28, thus sealing the space between these two rings and preventing further egress of the material. If, however, any material does tend to pass through the space between the floating ring 20 and the wear ring 28, it will enter the space 32 and tend to force the floating ring 21 against the wear ring 29 so as to seal tightly the space between these rings and prevent the material from going any further. Thus, the pressure in the chamber which tends to force the material therefrom about the rotor shaft, also acts to force the adjacent surfaces of the cooperating sealing rings together so as to tightly seal the space between the shaft and the end plate of the chamber and will thus prevent material being forced through this space.

As stated above, the rings 20 and 21 rotate with the shaft 13, and there will, therefore, be a certain amount of wear on the surface of these rings which abuts against the adjacent surfaces of the wear rings 28 and 29. Portions of the floating rings, as shown at 34 and 35 on Fig. 3, may be slightly cut away so that if there is wear upon these rings, the inner portions thereof below the wear rings 28 and 29 will not be forced into the space between the latter rings and the collar 18. Moreover, the wear of the floating rings will not affect the efficiency of the sealing means and, if these rings are permitted to move longitudinally of the shaft, the pressure within the chamber will maintain them at all times in tight contact with the wear rings 28 and 29 as this pressure is applied to the back of the floating rings and not upon their faces which abut the wear rings.

Figure 5:
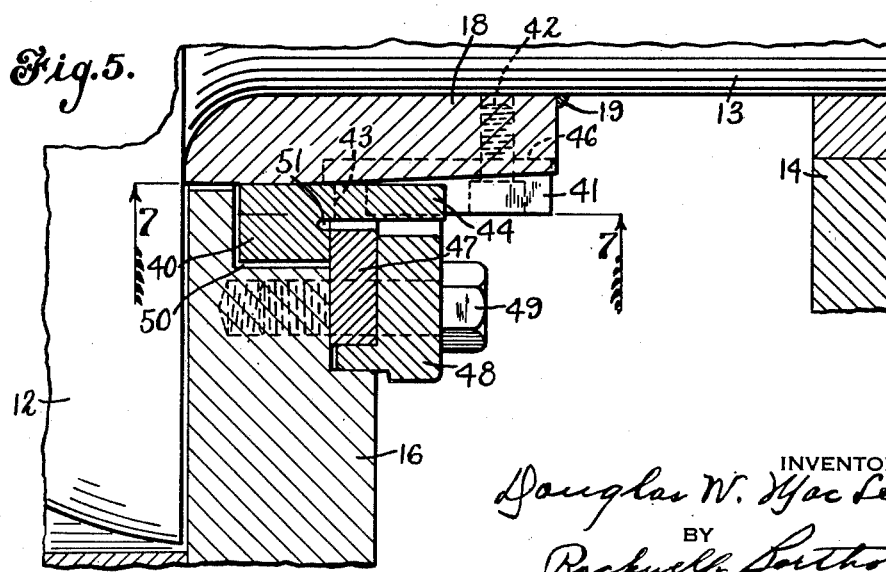
Fig. 5 is a partial sectional view similar to Fig. 3 showing a modified form of my invention.

In Figs. 5 to 7 of the drawings, I have shown a modified form of my invention in which only one floating ring is employed and a single cooperating wear ring. In this case a collar 18 is secured to the rotor shaft 13 as before and, as shown in Fig. 5, a floating ring 40 snugly surrounds this collar 18 and is secured slidably thereon by the key 41. This key may be secured to the collar by the screw 42 and engages in a recess 43 of the ring 40 so that the ring is allowed a limited floating movement axially of the shaft but is constrained to rotate with the shaft. It will be noted that the ring 40 is of greater thickness at its rear end adjacent the chamber and is provided with a flange or thinner portion 44 which extends outwardly and which is provided with the recess 43 within which is received the key 41. This key is also partially received in a recess 46 in the collar 18 so that as before the key lies partially within the collar and partially within the floating ring.

A wear ring 47 which preferably is sectional also surrounds the collar and the portion 44 of the floating ring 40, this wear ring being secured in place by a retainer ring 48 secured by bolts 49 to the end wall section 16. The retainer ring 48 may also be split or comprised of two or more sections so that it may be readily placed around or removed from the shaft 13.

It will be noted that there is a space 50 at the rear and lower faces of the floating ring 40 but that this ring fits snugly against the collar 18 so that any material which is forced into the space 50 by pressure in the chamber will force the floating ring 40 against the opposing face of the wear ring 47 thus sealing the space 50 so that no material can be forced from the chamber about the shaft 13. The floating ring 40 may be cut away or relieved slightly, as shown at 51, so that if the rotation of this ring against the rear face of the wear ring 47 tends to wear the floating ring, the latter will not be wedged between the ring 37 and the rotor. It will be understood that in both forms of my invention, the floating rings as well as the wear rings will be made of hard material so that while one rotates in contact with the other, the wear will be reduced as much as possible.

While I have shown and described some preferred embodiments of my invention, it will be understood that it is not to be limited to all of the details shown, but is capable of modification and variation within the spirit of the invention and within the scope of the claims.

What I claim is:

1. In a mixing or like machine having a chamber, a rotor in the chamber, a rotor shaft extending through the chamber, means for sealing the space between said shaft and the chamber wall comprising a pair of spaced ring members surrounding the rotor shaft, means keying said rings to the shaft for rotation therewith and for independent axial movement therealong, a second pair of ring members carried by the end wall of the chamber, each of said last-named members having a side face adapted to contact a side face of one of said first-named ring members and each of said first-named members having its opposite side face directed toward the chamber so as to be exposed to the pressure existing therein, a retainer ring, separate from said last-named ring members, secured to the casing in circumferential surrounding relation with said last-named ring members, and means cooperating with said retainer ring to hold said last-named ring members in place.

2. In a mixing or like machine having a chamber, a rotor in the chamber, a rotor shaft extending through the chamber wall, means for sealing the space between the shaft and the chamber wall comprising a pair of spaced ring members surrounding the rotor shaft, means keying said ring members to the shaft for rotation therewith and for independent axial movement therealong, a second pair of spaced ring members supported by the end wall of the chamber, each of said last-named ring members having a side face adapted to contact a side face of one of said first-named ring members, each of said first-named ring members having its opposite side face directed toward the chamber to be exposed to the pressure existing therein, a keyway in the rotor shaft having an open end facing away from the chamber for insertion of a key in a direction toward the chamber, and a single key in said way securing both of said first-named members to the rotor shaft, a separate retainer ring circumferentially surrounding said second-named ring members, and means coacting with said retainer ring to secure said second-named ring members in place.

References Cited in the file of this patent

UNITED STATES PATENTS

| | | |
|---|---|---|
| 968,390 | Naider | Aug. 23, 1910 |
| 1,187,212 | Westinghouse | June 13, 1916 |
| 1,925,898 | Fritz | Sept. 5, 1933 |
| 2,247,454 | Thomson | July 1, 1941 |
| 2,445,207 | Caserta | July 13, 1948 |